3,214,435
PREPARATION OF N-ALKYL-2-OXAZOLIDINONES

George E. Ham, Lake Jackson, Tex., assignor to The Dow Chemical Company, Midland, Mich., a corporation of Delaware
No Drawing. Filed Aug. 21, 1963, Ser. No. 303,652
7 Claims. (Cl. 260—307)

This invention relates to processes for making N-alkyl-2-oxazolidinones by the molecular rearrangement of 2-alkoxy-2-oxazolines:

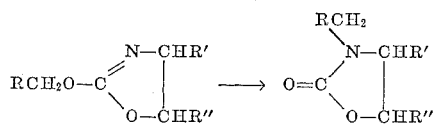

R in the above formulas can be alkyl, alkenyl or aralkyl and R' and R" can each be H or one of the foregoing hydrocarbon radicals.

The rearrangement is effected by contacting the oxazoline with an alkyl halide at a temperature of about 25–200° C. The halide is preferably a primary alkyl bromide or iodide having 1–15 carbon atoms, such as, for instance methyl iodide, ethyl iodide, butyl bromide, octyl bromide, decyl iodide, dodecyl iodide or pentadecyl bromide.

The preferred oxazolines are those wherein at least one, and preferably both of R' and R" are hydrogen and R is a lower alkyl radical, i.e., an alkyl radical containing up to 4 carbon atoms.

The reaction is preferably conducted in an inert solvent, though this is not essential. Suitable solvents include the aliphatic nitriles, ketones, halohydrocarbons, ethers, sulfoxides and the lower N,N-dialkyl fatty acid amides. Among such solvents are acetonitrile, diethyl ether, acetone, chloroform, ethylene chloride, dimethyl sulfoxide, N,N-dimethylformamide, ethylene glycol dimethyl ether and the like.

In carrying out the process of the invention, the oxazoline, with or without a solvent, is mixed with a catalytic amount, suitably about 1–25% by weight, of the catalyst and the mixture is then maintained at the reaction temperature until substantial rearrangement has occurred. The oxazolidinone is then separated from the reaction mixture and any unreacted oxazoline, together with any recovered catalyst, is recycled to the process. The time required for the reaction varies widely, depending on the reactivity of the particular materials being used and their concentration and the reaction temperature. Best results are usually obtained by use of long reaction times at low temperatures, such as several hours to several days at 50–100° C.

The practice of the invention is illustrated by the following example.

A mixture of 10 g. of 2-ethoxy-2-oxazoline, 1.93 g. of ethyl iodide and 100 ml. of acetonitrile was refluxed (80° C.) for 9 days. The solvent was then removed under reduced pressure and the residue distilled under 0.2 mm. pressure. There was thus obtained 6.84 g. (68.4% yield) of N-ethyl-2-oxazolidinone; B.P. 82–85° C./0.2 mm. The structure was confirmed by infrared analysis.

Other oxazolines as above defined can be isomerized to the corresponding oxazolidinones by heating with an alkyl halide as shown above. Suitable oxazolines include 2-methoxy-, 2-propoxy-, 2-isobutoxy-, 2-butoxy-, 2-allyloxy-, 2-(2-methallyloxy)-, 2-benzyloxy-, 2-(2-phenethoxy)-, and 2-(4-methylbenzyloxy)-2-oxazolines and the corresponding 2-substituted-2-oxazolines having a lower alkyl radical in the 4- or 5-position or both the 4- and 5-position on the oxazoline ring.

I claim:
1. The process for isomerizing an oxazoline having the formula

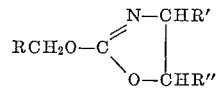

to produce an oxazolidinone having the formula

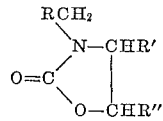

where in each of the above formulas R is a radical selected from the group consisting of alkyl, alkenyl, and aralkyl radicals and R' and R" are radicals selected from the group consisting of H and R, said process comprising contacting the oxazoline with an alkyl halide and separating the thus formed oxazolidinone.

2. The process of claim 1 wherein the alkyl halide is a primary alkyl halide containing 1–15 carbon atoms and the halogen therein has an atomic number from 35 to 53.

3. The process of claim 2 wherein a mixture of the oxazoline and the alkyl halide is heated in an inert solvent at 25–200° C. for 1–10 days.

4. The process of claim 3 wherein R is a lower alkyl radical and R' and R" are each H.

5. The process for making N-ethyl-2-oxazolidinone comprising heating 2-ethoxy-2-oxazoline at 50–100° C. while in contact with a catalytic amount of lower alkyl iodide and separating the thus formed N-ethyl-2-oxazolidinone.

6. The process of claim 5 wherein the iodide is ethyl iodide.

7. The process for making N-ethyl-2-oxazolidinone comprising heating a solution of 2-ethyl-2-oxazoline in acetonitrile with about 20% by weight, based on the oxazoline of ethyl iodide at about 80° C. for about 9 days and separating the thus formed N-ethyl-2-oxazolidinone.

No references cited.

NICHOLAS S. RIZZO, *Primary Examiner.*